Dec. 2, 1958                J. TOGGENBURGER                2,862,595
                 PROPORTIONAL LETTER-FEED MECHANISM FOR
                         TYPEWRITERS OR THE LIKE
Filed Oct. 18, 1954                                   3 Sheets-Sheet 1

INVENTOR.
JOHN TOGGENBURGER
BY
Jesse A. Holton
ATTORNEY

Dec. 2, 1958  J. TOGGENBURGER  2,862,595
PROPORTIONAL LETTER-FEED MECHANISM FOR
TYPEWRITERS OR THE LIKE
Filed Oct. 18, 1954  3 Sheets-Sheet 2
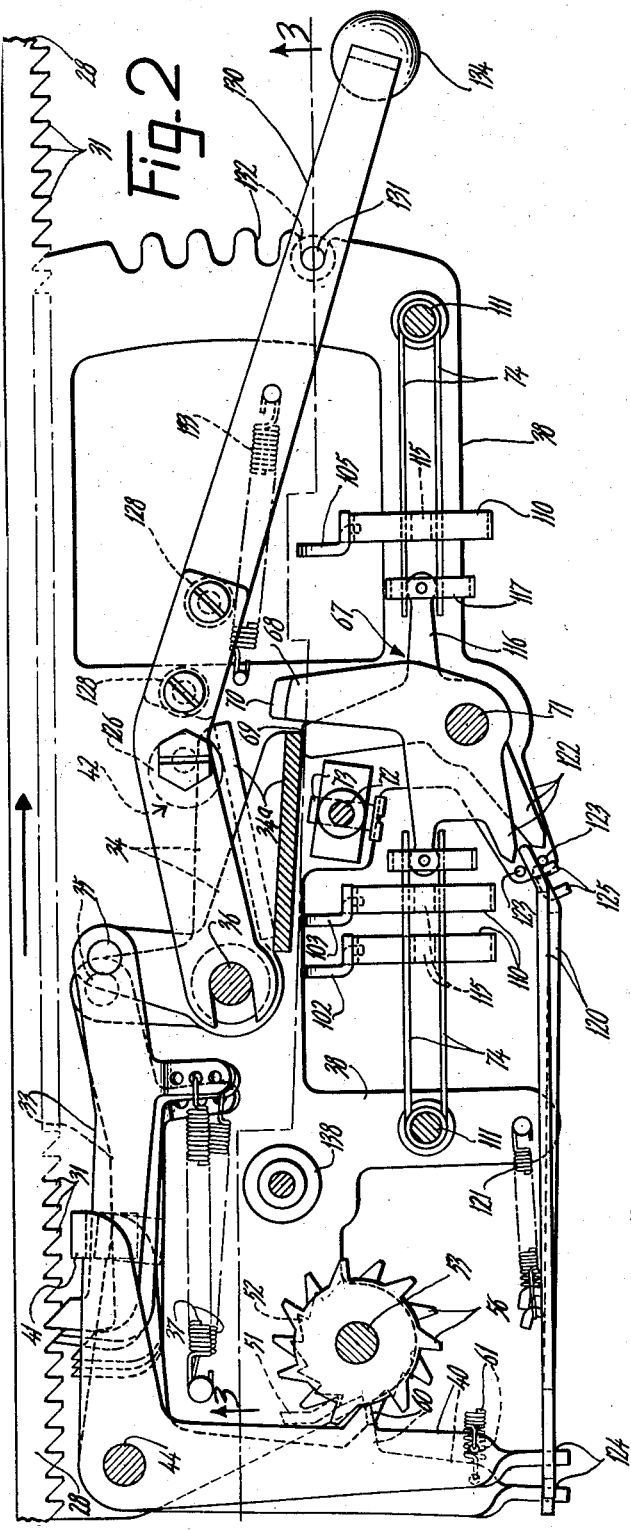
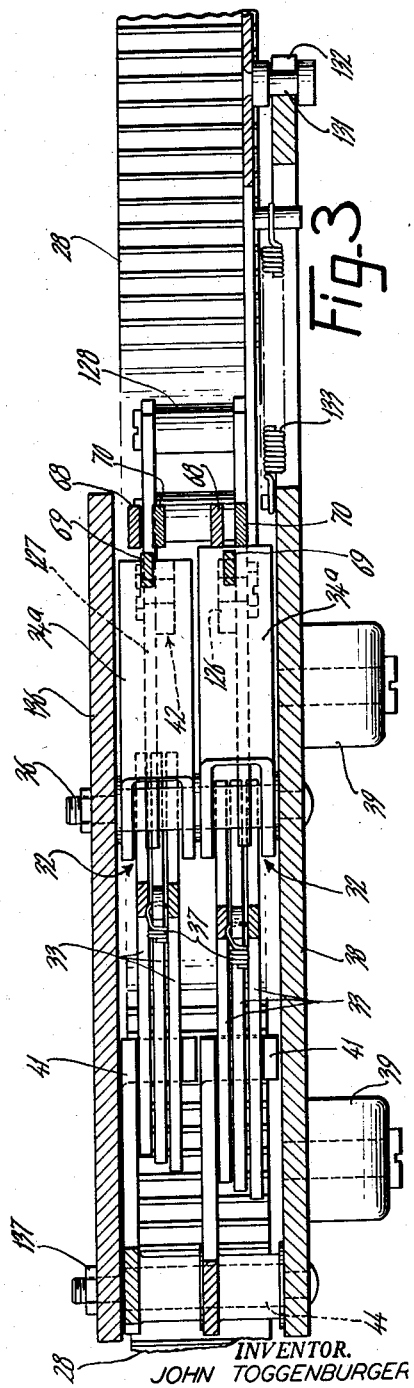
INVENTOR.
JOHN TOGGENBURGER
BY
*Jesse A. Holton*
ATTORNEY

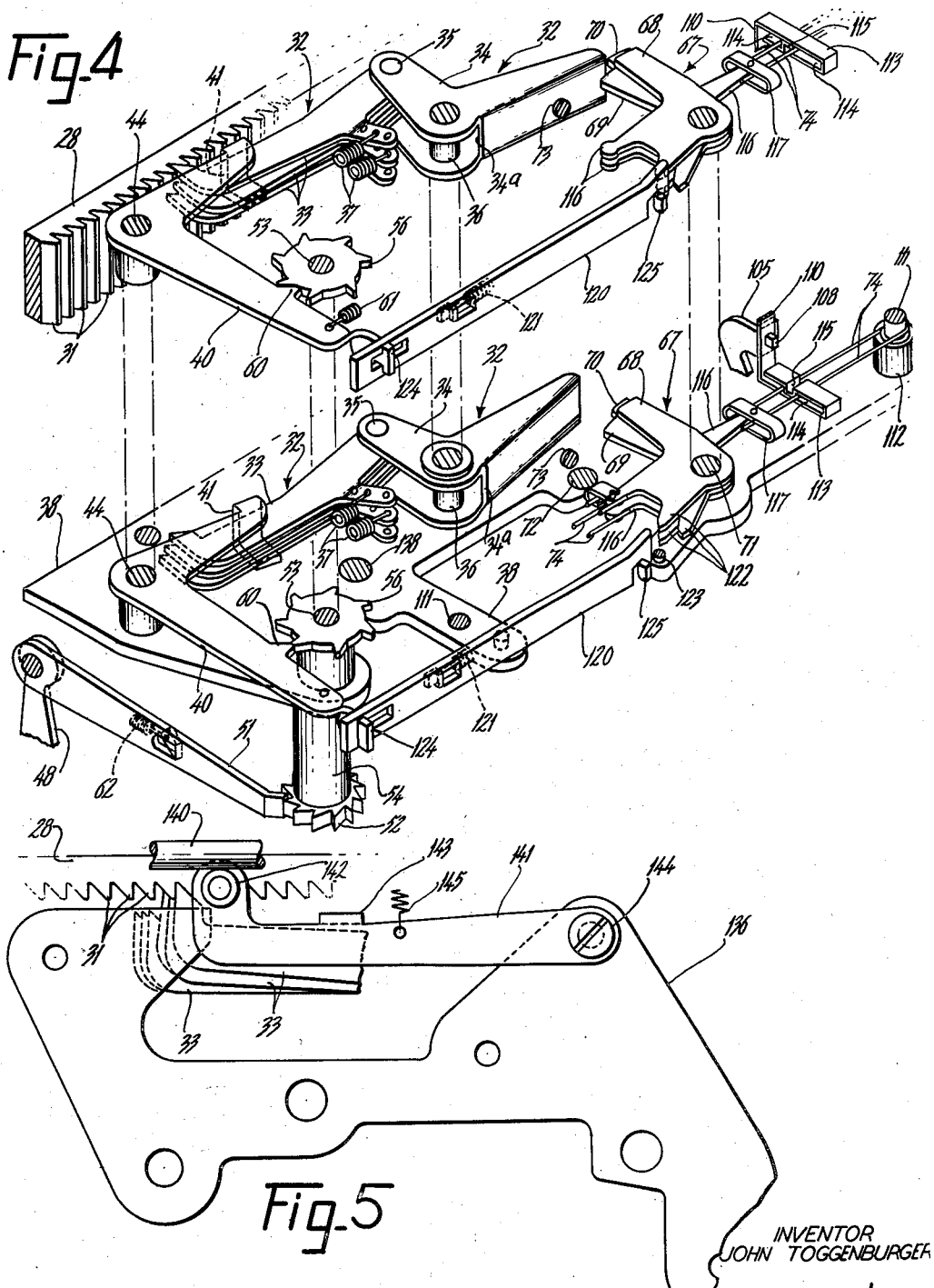

United States Patent Office 2,862,595
Patented Dec. 2, 1958

2,862,595

PROPORTIONAL LETTER-FEED MECHANISM FOR TYPEWRITERS OR THE LIKE

John Toggenburger, Hartford, Conn., assignor to Underwood Corporation, New York, N. Y., a corporation of Delaware Application October 18, 1954, Serial No. 462,670

26 Claims. (Cl. 197—84)

This invention relates to typewriters or similar machines, that is to machines of any sort which by selective operations render characters or images thereof on a record medium, and more particularly to mechanisms in such machines for letter-feeding a carriage or equivalent thereof, proportionally to the widths of the characters that are being typed, preferably in terms of multiples of a given small feeding increment.

Many proportional letter-feed mechanisms are known, but generally they fail to satisfy present-day requirements for functioning accurately at high typing speeds because certain parts pertinent to feed measuring action must, incident to each typing stroke, execute a measuring as well as a returning stroke. A requisite for accurate operation is that the parts pertinent to the space-measuring action must be substantially ready and poised for such action when in a typing stroke a type makes its imprint. Obviously if the mechanism is such that at fast successive typing operations certain parts pertinent to the space measuring action have insufficient time to attain accurate initial space-measuring position, then there will be a failure to measure out the required, accurate feed increments. Obviously, this is the case particularly if the variation of required letter-feed is relatively minute.

The proportional feed mechanism of the present invention comprises generally two space-measuring devices which are conditioned and called into operation alternatively at alternate typing strokes, in each instance to measure out to the carriage the appropriate feed step as called for by the width of the particular character that is typed. Each time either one of said devices measures out the required number of feed increments, the other device automatically assumes a position to be available promptly for accurate space-measuring action at the next typing stroke.

In accord with the above, it is a general object of the invention to provide a proportional letter-feeding mechanism which will perform efficiently, reliably and accurately at very high typing speeds.

It is another object of the invention to provide a proportional letter-feeding mechanism which functions efficiently and accurately at high typing speeds and which moreover is simple in structure and manufacturable at low cost.

A further object of the invention is to provide a proportional letter-feeding mechanism which is fully ready to commence accurately its measuring action as the carriage is freed for each letter-feeding step regardless of the rapidity at which the successive typing strokes occur.

A more specific object of the invention is to obtain accurate proportional feed of a carriage at high typing speeds by provision of two escapement devices which at successive typing operations are conditioned and called into operation alternatively.

A further object of the invention is to provide two escapement pawl devices cooperative with a toothed means having connection with the carriage, the said two pawl devices being adapted at alternate typing strokes to be brought alternatively, one at a time, into engagement with said toothed means and being controlled moreover in accord with the character that is being typed to measure out accurate, different-extent carriage-feed movements.

It is a still further object of the invention to provide an efficient proportional letter-feed mechanism which can be set conveniently to yield expanded spacing of variable magnitude.

An object adjunct to the preceding one is to provide for expanded spacing without the carriage being repositioned to any degree while the setting is being effected.

Many other objects and features will be apparent upon consideration of the detailed description which follows, as such description is read in the light of the accompanying drawings.

In the drawings, Figure 1 is a left-hand sectional side view of a typewriter embodying the mechanism of the invention.

Figure 2 is a sectional plan view of a proportional space letter-feed mechanism, as seen when standing at the rear of the machine.

Figure 3 is a sectional plan view taken along line 3—3 of Figure 2.

Figure 4 is a perspective view of the mechanism seen in Figure 2, two groups of parts being shown vertically dispersed.

Finally, Figure 5 is a plan view complementing Figure 2, and showing a mechanism whereby the proportional letter-feeding mechanism is releasable at will.

Figure 1:
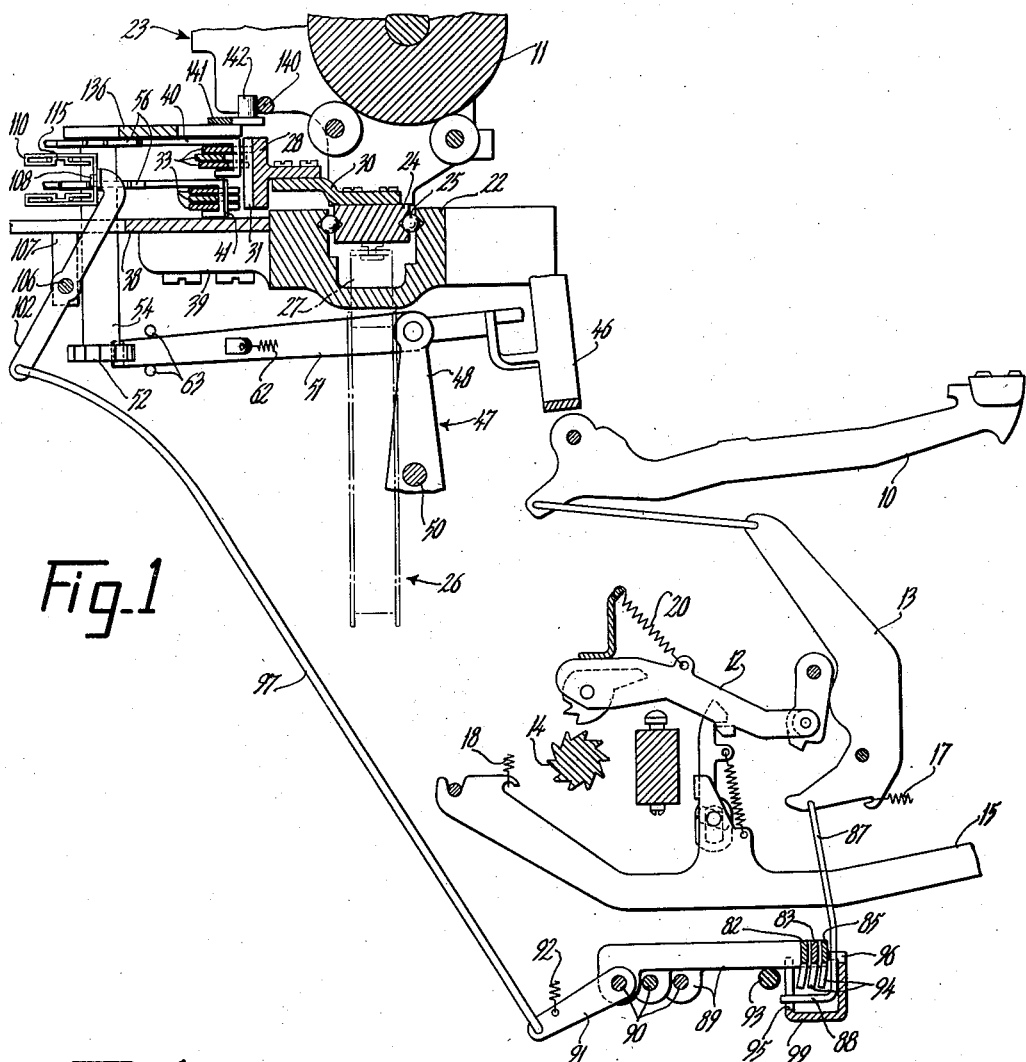
Figure 1A is a sectional plan view of a universal bar-operable ratchet wheel operating mechanism.

Referring now more particularly to Figure 1, the invention is applied to an Underwood All-Electric typewriter which embodies a power typing mechanism of the kind shown in the patent to Yaeger No. 2,254,764, dated September 2, 1941. Said typing mechanism includes many type bars 10 individually swingable against a platen 11 to type at a common typing point. Each type bar 10 is power operable by an actuator 12 through a train of mechanism comprising a generally upright sub-lever 13, there being a transverse row of actuators 12 and a transverse row of sub-levers 13. All of said actuators 12 are normally spring-held clear above a toothed power roll 14 and are adapted to be lowered into toothed, motion-receiving relation with said roll, the said roll 14 rotating constantly in the direction of the arrow when the machine is in use. Key levers 15, one for every actuator 12, are individually operable to connect the actuators 12 selectively with the power roll 14 for single transitory operations, thereby to effect selective operations of the type bars 10 against said platen 11. Springs 17, 18 and 20 bias the parts of the described type actions toward their normal positions shown in Figure 1. The stated typing mechanism is supported in a frame-structure which comprises a trackway 22 whereon a carriage 23 is guided for travel, the said carriage having turnably supported thereon the said platen 11. For carriage guiding cooperation in the trackway 22 the carriage includes a channel bar 24, there being usual antifriction elements 25 provided between the trackway 22 and said channel bar.

The carriage 23 is constantly urged in letter-feed direction, that is leftwardly, by a spring motor which is indicated at 26 and has a draw-band connection 27 with the carriage. However, movement of the carriage is subject to the control of a novel proportional letter-feed mechanism which will presently be described.

The proportional feed mechanism is of a design adapted to feed the carriage in varying multiples of definite, fine increments. For example, when the letter "i" is typed the carriage executes a two-increment movement and when the letter "W" is typed, the carriage executes a five-increment movement.

An escapement rack 28 extends lengthwise of the carriage and is supported thereon by several laterally spaced brackets 30 which are fast on and reach rearwardly from the carriage channel bar 24. So that the rack bar 28 may be relatively rigid and yet light in weight it may be of T shaped cross section, as shown. The rack bar 28 has teeth 31 at intervals therealong corresponding exactly to a certain multiple of the increments in terms of which the carriage is to be fed. In the embodiment of the invention shown the said teeth 31 occur at intervals corresponding to three of the stated increments. For cooperation with the rack teeth 31 there are provided two identical escapement or stepping devices 32 which are adapted to exercise alternatively control over the carriage by being alternately entrained therewith. In the embodiment of the invention shown each of said escapement devices 32 comprises three dogs 33 which are substantially identical, except that they are of graduated lengths differing in terms of single increments. The dogs 33 of the two escapement devices 32 are borne pivotally on independent rocker elements 34 by means of pivot pins 35. The said rockers 34 are formed of sheet metal and each comprises two spaced walls connected by a web 34a. They have pivotal support on a common stationary stud 36 rising from a horizontal bracket plate 38 which has support on bosses 39 extending rearwardly from the trackway 22, see Figure 1. Springs 37 individual to the dogs 33 bias them pivotally and individually about said pins 35 toward the rack 28. At the same time the springs 37 urge the dogs lengthwise of the carriage 23, counter to the direction of letter-feed movement indicated in Figure 2 by an arrow applied to the rack 28. The two escapement devices 32 are so controlled that at alternate typing operations of the machine the two sets of dogs 33 are alternatingly moved into engagement with said rack 28, whereby at alternate typing strokes the two sets of dogs are alternatingly placed in control over the carriage to determine varyingly the feed-movement of the carriage. Although the rack 28 is of coarse pitch, it will be observed that when either of said sets of dogs 33 is thrown into engagement therewith, there will be effected a vernier engagement at definite increments corresponding to those at which the pawls 33 differentiate in length. In the embodiment shown this is at increments which are one third the size of the intervals at which the rack teeth 31 are provided, it being understood that any one of the three dogs 33 thrown into engagement may become the active one, dependent on the lateral relative positions of the rack 28 and the dogs prevalent at the time the engagement takes place. There is individually associated with each set of dogs 33 a control element in the form of a bell crank 40, each such bell crank having a vertical tab 41 for forcing its related dogs 33 free of the rack 28. Said bell cranks 40 are coaxially supported, one above the other, upon a stud 44 projecting from the bracket plate 38. Having reference to Figures 2 and 4, it is to be observed that said bell cranks 40 normally occupy different positions, either one being normally in a position allowing spring-urged engagement of its related pawls 33 with the rack 28 and the other bell crank 40 being in a position holding its related pawls 33 clear of the teeth 31 of the rack 28. At each typing operation the positions of the bell cranks 40 are reversed by the operation of a conventional universal bar 46 which is operable by any one of the type bars 10 very late in the movement thereof against the platen 11. The said universal bar 46 is of conventional, curved design and is operative on a rocker 47 comprising two laterally spaced arms 48 connected by a bridging rod 50, the pivotal axis of the rocker being at the center of said rod. The rocker has rearwardly reaching therefrom a pawl 51 to impart at each rearward operation of the universal bar 46 a step-movement to a ratchet wheel 52 carried fast on the lower end of a vertical shaft 53. The latter is turnably accommodated in a vertical boss 54 of the bracket plate 38 and has at the level of each bell crank 40 a toothed wheel 56. Both these toothed wheels 56 have half the number of teeth which said ratchet wheel 52 has. Moreover, the teeth of the two wheels 56 are circularly interspersed with respect to each other. In Figure 2 it will be seen that the upper bell crank 40 is in an anticlockwise moved position and thus has caused the engagement of its related pawls 33. Such position of the bell crank is due to a nose 60 thereon having entered between two teeth of the upper wheel 56. The lower bell crank 40 is in a clockwise moved position holding the lower set of pawls 33 free of the rack 28. Such position of this bell crank exists because a tooth on the lower wheel 56 has crowded outwardly a nose 60 on the bell crank. Under the tension of the dog springs 37, assisted by springs 61, the said bell cranks 40 are under constant urge to move anticlockwise in respect to Figure 2.

The teeth of the wheels 56 and the said bell crank noses 60 are of such correlated design that when at any operation of the universal bar 46 both of the wheels 56 are given a half-tooth advance, one of the bell cranks, considered with respect to Figure 2, resultingly will be cammed clockwise and the other will snap anticlockwise. It will be observed that always the stated anticlockwise snapping of the bell cranks 40 ensues only in the stated half-tooth advance of its related wheel 56, and that the clockwise movement of the other bell crank 40 will be effected relatively slowly. This provides that always before one set of dogs 33 moves clear of the rack 28, the other set of dogs will already have assumed a controlling relation to said rack 28, wherefore the carriage is always under full control of at least one of the stated escapement devices 32. Stating it in another way, in each typing operation the escapement or stepping device 32 which happens to stand disentrained is first entrained and then the other escapement device is disentrained.

The feed pawl 51 for the ratchet wheel 52 has a spring 62 associated therewith in a manner to bias it into engagement therewith and also to urge it and the rocker 47 toward normal, forward position. The universal bar 46 and the rocker 47 take part in the downward shift of the system of type bars 10, in a conventional manner, for typing by upper case characters. Frame-supported pins 63 keep the rear end of the pawl 51 at the operating level of the wheel 52, regardless of the stated shift of the rocker 47 with the type bar system.

Figure 1A:
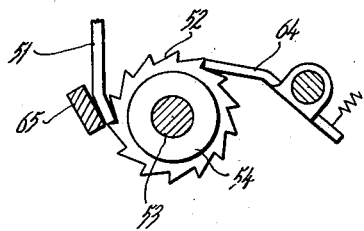

Referring to Figure 1A, a spring-pressed detent 64 is associated with the wheel 52 to check it against reverse movement after each actuation by the pawl 51. To prevent overthrow each time the wheel 52 becomes fully operated, the pawl 51 engages a stationary overthrow stop indicated at 65, and thereby also stops the wheel from overthrowing.

Either of the sets of dogs 33, when moved free of the rack 28 by the pertinent bell crank 40, moves under the influence of its springs 37 counter to the carriage feed direction until the web 34a of the supporting rocker 34 limitedly engages a stationary abutment means 42. In Figure 2, the lower set of dogs 33 is shown as having so limitedly moved. Either set of pawls 33 when so moved to the limit of the abutment means 42 may be considered to be in initial space-measuring position. At every typing stroke the positions of the bell cranks 40 become reversed and that escapement device 32 of which the pawls 33 become engaged with the rack 28 will then be instrumental by cooperation with the rack 28 to restrict the spring-drawn movement of the carriage rightwardly in respect to Figure 2, to variable extents, differentially determinable by stop means generally designated by the numeral 67. The said stop means 67 is variably conditionable at each typing operation, generally relatedly with the width of the character that is being typed, in a manner so that letter-feed movements of the carriage will be produced which in terms of the aforestated increment or unit are generally proportional to the widths of the characters that are being typed. The differentially conditionable stop means 67 comprises for each escapement rocker element 34 a set of three independently swingable stop elements 68, 69, 70, the said element 68 restricting rocker movement to produce a three-increments letter-feed space, the rocker element 69 restricting rocker movement to produce a four-increments space and the stop element 70 being adapted to produce a two-increments space. The stated stop elements 68 to 70 are pivotally supported on a vertical stud 71 rising from the bracket plate 38. On a post 72 also fast on said plate 38 there is for each one of the rockers 34 an adjustable abutment in the form of a screw 73 constituting a five-increments stop.

As will be perceived hereinafter, individual spring elements 74 exert a bias on said stop elements 68, 69 and 70 to urge them to their positions in which they are illustrated in Figure 2. The normal tendency of either of the four-increments stop elements 69 is therefore to stand in the path of its related rocker 34 and the normal tendency of all the stop elements 68 and 70 is to stand clear of their related rockers. At each typing operation the stop elements associated with the rocker 34 which is to execute a space-measuring stroke are so controlled that the appropriate stopping condition for such rocker will prevail. The mechanism for such control will now be described.

At the bottom of the machine there are provided three bail bars 82, 83 and 85, variously subject to upward operation by certain of the type action sub-levers 13, through wire links 87 pivotally pendant from the sub-levers, said links having forwardly bent lower ends 88 underlying the said bail bars. Each of said bail bars 82, 83 and 85 is a part of a bail structure including two spaced arms 89 and a connecting shaft 90, the latter having pivotal support in the opposite sides of the machine frame. Each of said bails comprises further a rearwardly extending arm 91 having a spring 92 associated therewith, such springs urging the bail bars 82, 83 and 85 downwardly to a limit of a stop pin 93 indicated in Figure 1. The bail 82 serves to control the conditionable means 67 for determining a two-increments space and accordingly has downreaching lugs 94 opposite such of the ends 88 of wire links 87 only which belong to type actions which are to cause a two-increments feed. The bail bar 83 has lugs 94 appropriately provided opposite only such link ends 88 which are related to type actions requiring a three-increments feed. In a similar manner the bail bar 85 has lugs 94 for operation only by link-ends 88 related to type actions requiring a five-units feed. Type actions calling for a four-increments feed have no bail associated therewith because the four-increments stop 69 is normally influenced to active position.

A generally U-shaped bar 99 extends transversely of the machine and has transverse guide slots 95 and 96 provided for the links 87 therein. The said U-shaped bar may be connected to the case-shift mechanism of the machine so that when the type bar system is case shifted, in a manner well known but not shown, it will be shifted endwise to place the link ends 88 transversely of the machine for cooperation with other bail lugs 94 arranged to cause appropriate incremental letter feed of the carriage suited to the various upper case types.

From each arm 91 of the several bails there extends upwardly and rearwardly a pull link 97, said links severally connected with generally upright levers 102, 103 and 105. The latter are pivotally carried on a rod 106 which at laterally spaced points is supported by studs 107 downreaching from the plate 38. Each of said levers 102, 103 and 105 carries fastened thereon, as at 108, see Figures 1 and 4, an element 110 having two branches 113, for action on two of the spring elements 74. The levers 102, 103 and 105, through the said links 97, are respectively operable by the bails 82, 83 and 85. The lever 102 has an element 110 thereon of which the branches 113 are arranged appropriately for action on the spring elements 74 which are associated with the two-increments stop elements 70 of the two escapement devices 32. Similarly, by two branches 113 of the lever 103, also through the medium of spring elements 74, there are controlled the respective stop elements 68 of the two escapement devices 32.

The stop elements 69 are subject to control by the lever 105, which similarly to the levers 102 and 103 carries an element 110 having two branches 113. It will be noted that the lever 105 and its related spring elements 74 are arranged for operating the stop elements 69 in a direction opposite to that in which the stop elements 68 and 70 are operable, and moreover that operation of either stop element 69 associated with the rocker 34 next to be active in a space-measuring stroke places such rocker under the motion-limiting control of the related five-increments stop 73.

The spring elements 74 are formed of spring wire and comprise each a front leg and a rear leg connected by a few helical turns, the latter tensioning said legs toward each other. Studs 111 rising from the plate 38 give support to the spring elements at said helical turns, there being locating collars 112 on the studs.

Each of the branching elements 110 consists of a narrow strip of sheet-metal, formed, as seen in Figure 1, to provide a lower, as well as an upper, doubled-over branch 113. The doubled-over branches 113 provide each a lug 115 straddling the two legs of the related spring element 74, and also slots 114 by which the two legs of the spring element are kept lined up with said lug. The various stop elements 68, 69 and 70 have each a slender arm 116 straddling the legs of the related spring element 74. To keep said legs operatively lined up with said arms 116, the latter may have clips 117 secured thereto by spot welding or otherwise, see Figure 4.

When as a result of an operation of any type action the two lugs 115 of one of said branching elements 110 are rearwardly displaced, they force the rear legs of the two associated spring elements 74 rearwardly and concomitantly enable the front legs of the same spring elements for resilient rearward action on the arms 116 of the associated stop elements.

It will be evident that spring-leg tension exerted rearwardly on the stop element belonging to that rocker 34 which is next to be active will directly operate such stop element because it is free to move. On the other hand spring-leg tension exerted rearwardly on the other stop element, that is on the stop element which belongs to the rocker which stands operated, may have no effect if such stop element stands obstructed by the operated rocker or if at the time the operated rocker is stopped thereagainst. Whether or not such stop element be operated is immaterial, inasmuch as it has no service to perform at the time. Due to the provision of the spring elements 74 the stop elements belonging to the two rockers 34 are controllable in a simple manner for alternatively determining the strokes of the latter.

From the above it follows that toward the end of any operation of a type action the appropriate stopping condition will be set up for the particular rocker 34 which is to execute a letter-feed measuring movement. In the same typing operation, after this stopping condition is set up, the dogs 33 of such rocker are automatically engaged with the rack 28 and the other dogs 33 are automatically disengaged. The carriage then feeds under the urge of the draw spring 26 to the extent allowed by the set-up stopping condition. Always the particular set of dogs 33 which are thrown out in a typing stroke will assume immediately initial space measuring positions and will settle therein accurately long before the relatively heavy carriage will conclude its letter-feed step.

Significantly, always one or the other set of dogs 33 will be in perfect control over the carriage. The proportional feed mechanism will function reliably even in the event an escapement operation is instituted before the full completion of the previous letter-feeding step.

The carriage rack 28 is freed for taking a letter-feed step each time the universal bar 46 at the end of a typing stroke becomes operated and causes a substitution of one set of dogs 33 for the other set. The bails 82, 83 and 85 are subject to operation slightly earlier in each typing stroke, so that always the stop elements 68, 69 and 70 are appropriately positioned before a letter-feed step commences.

Any operated bail 82, 83 or 85, along with its associated lever 102, 103 or 105, restores early in the return of an operated type action, but whatever stop elements 68, 69 or 70 may have been operated for determining the space measuring throw of a rocker 34, must stay operated. To this end there is provided a detent slide 120 in association with each set of stop elements 68, 69 and 70. Individual springs 121 urge these slides 120 rightwardly in respect to Figures 2 and 4, the various stop elements 68, 69 and 70 having fingers 122 which said detent slides are adapted to block against return from operated position. Closely to the fingers 122 the said detent slides 120 are guided by means including pins 123 on the plate 38 to move radially of the stud 71 supporting the stop-elements. Each of said detenting slides 120 has a loose articulation, as at 124, with one of the bell cranks 40, a slot being provided in each slide 120. Either of said bell cranks 40 when moved to hold the associated set of dogs 33 clear of the feed rack 28 will displace its related detent slide 120 clear of the detenting fingers 122 of the stop-elements 68, 69 and 70 associated with the rocker which last has measured out a feed space. On the other hand, either bell crank 40 which moves to engage its associated dogs 33 with the feed rack 28 will allow its related detent slide 120 to be drawn by its spring 121 into position to hold the moved stop element by its finger 122. The movement of either detent slide 120 to effective position occurs impositively under the control of the bell crank 40 which is articulated thereto, this being facilitated by the provision of the stated slots at said articulations 124. On the other hand, movement of either slide 120 out of detenting position is effected positively by said bell cranks 40. For limiting the detenting movement each of the slides 120 has an ear 125 engageable with one of the pins 123. It will now be seen that with respect to the rocker 34 which in consequence of the typing stroke is to execute a space measuring movement, the stopping condition set up by the elements 68, 69 and 70 will prevail under control of the related detenting slide 120 as long as necessary, namely until there ensues another alternation of the two sets of dogs 33 in respect to the feed rack 28. It is to be understood here that the earlier return of any of the levers 102, 103 or 105 is facilitated by the capacity of the legs of the spring elements 74 to spread.

It has been stated that the rockers 34 move to their initial space-measuring positions against abutment means 42. In respect to either rocker 34 this is whenever the dogs 33 associated therewith are moved clear of the feed rack 28. In order to vary the space measuring strokes of the rockers 34 the said abutment means 42 is adapted to be given a series of positions radially about the fulcrum stud 36 of the rockers 34. The abutment means 42 comprises an individually adjustable eccentric 126 on each of two identical supporting arms 127, one of said arms 127 with an eccentric 126 thereon being accommodated between the spaced walls of each rocker 34. As is evident from Figure 3, the supporting arms 127 are fastened together in vertically spaced relation by studs 128 which tie also the control lever 130 in underlying relation fast thereto.

Spacers, not shown, provided on the stud 36 between the spaced walls of the rockers 34, give the arms 127 appropriate elevations for the eccentrics 126 to coact with the rocker webs 34a.

The assembly comprising the arms 127, the abutments 126 and the control lever 130 is adjustable about the stud 36 to give the rockers 34 increased space-measuring motion. The arms 127 are forked at the stud 36 to allow displacement of the stated adjustable assembly radially of the stud. Normally, a detent pin 131 on the control lever 130 engages one of the notches 132 provided in the bracket plate 38 along an arc which is concentric with the stud 36. A spring 133 having anchorage on the plate 38 urges the assembly comprising the control lever 130 radially towards the stud 36 to thereby seat the detent pin 131 in the appropriate notch 132. The control lever 130 has beyond the left side of the machine a button 134 whereby it is conveniently settable to the different notches 132. In Figure 2 said lever 130 is set for the escapement devices 32 to yield normally feed-steps ranging from two to five increments. Adjustment of the lever 130 to successively adjacent notches 132 will predetermine for said escapement devices 32 feed-movements enlarged progressively in terms of single feed increments. It will be noted that adjustment of the control lever 130 has no influence on the prevailing position of the carriage 23, because the rocker 34 affected by the adjustment has its escapement dogs 33 free of the feed rack 28.

The described mechanism for feeding the carriage proportionately to the width of the characters is almost entirely supported on the bracket plate 38 from which there rise the aforestated studs 36, 44, 71, 72, as well as a heavy stud 138. The structure comprising these parts is reinforced by a top plate 136, see Figures 3 and 5, seatedly secured upon reduced ends of said studs by nuts 137, or otherwise. A very rigid unit is then formed.

The carriage 23 embodies extending lengthwise thereon a bail rod 140 for bodily rearward movement. This rod is operable rearwardly by carriage release levers, not shown, provided on the carriage. When rearwardly operated, said rod 140 actuates an escapement releaser 141 which is in the form of a lever pivotally supported at 144 on the plate 136, said releaser having a roller 142 for engagement by the rod 140. When the releaser 141 is so operated, a downreaching tab 143 thereon throws from the feed rack 28 either set of dogs 33 which happens to be engaged. A spring 145 biases the releaser 141 to the position seen in Figure 5. After appropriately adjusting the carriage, the restoration of the bail rod 140 will cause one set of pawls 33 to re-engage the rack.

It is to be realized that the two stepping devices may have controlling association with an element geared to the carriage rather than with an element directly supported on the carriage.

Furthermore, in the embodiment of the invention shown, each stepping or escapement device 32 has several dogs 33 for vernier engagement with widely spaced rack teeth. Obviously a coarsely toothed rack is more easily manufacturable and will stand up better than one having teeth at fine increments. Also the dogs 33 will get a deep and firm bite in between the teeth of such rack. A further advantage of the coarsely toothed rack is that it lends itself for tabulating the carriage accurately in accord with the spacing of the coarse rack teeth. However, it is to be understood that the invention comprehends such modifications as the use of two single-dog stepping devices for alternative entrainment with finely spaced teeth or even the alternative entrainment of two stepping devices frictionally with the carriage.

In general, while only one embodiment of the invention has been shown and described, many variations may be resorted to within the scope of the invention, and portions of improvements may be used without others.

What is claimed is:

1. In a machine having a typing mechanism selectively operable to type different characters and having also a carriage; a proportional letter-spacing mechanism for said carriage, comprising two devices for stepping it alternately, and means controlled by said typing mechanism at successive selective operations thereof to call alternately the two stepping devices into operation and additionally to condition that stepping device which is called into operation to determine for the carriage variedly a step-movement which is generally proportional to the width of the particular character that is being typed.

2. In a typewriting machine having a series of selectively operable means to cause the machine to type different characters, the combination with a letter-feeding carriage of two stepping means to measure out alternately a feeding step to said carriage, either of said stepping means adapted to have normally control over the carriage, means to place said two stepping means alternately in control over the carriage by the selective operations of said operable means, and means for said operable means by each selective operation thereof to so regulate the stepping means which is being placed in control that it will measure out to the carriage a feed-step which is generally proportional to the particular character that is being typed.

3. The invention set forth in claim 2, and manually settable means supplementing said regulating means for the two stepping means to measure out uniformly enlarged feeding steps to the carriage.

4. In a typewriting machine having a series of means which are selectively operable to cause different characters to be typed, the combination with a letter-feeding carriage and means urging the carriage impositively in a letter-feeding direction, of two stepping means adapted to be operatively entrained with the carriage alternately to measure out in each instance a feeding step thereto, either one of said stepping means being normally so operatively entrained, means to entrain the two stepping means alternately with said carriage by successive selective operations of said operable means, and means controlled by the selective operations of said operable means to regulate in each instance that stepping means which is next to be active, to measure out to the carriage a feed step which is generally proportional to the character that is being typed.

5. In a typewriting machine having a series of means selectively operable to cause different characters to be typed, the combination with a letter-feeding carriage and means impositively urging such carriage in a letter-feeding direction, of two stepping means adapted to be operatively entrained alternately for movement by the impositively urged carriage from normal positions, abutment means from which each of said stepping means is movable by the impositively urged carriage, means to bias each of said stepping means into engagement with said abutment means when not entrained with said carriage, movement-limiting means for said stepping means, variably conditionable by the selective operations of said operable means to restrict varyingly the movement of whichever stepping means is next to receive a carriage-urged movement, and means to entrain said two stepping means alternately with said carriage at the selective operations of said operable means.

6. The invention set forth in claim 5, including means to adjust said abutment means for said two stepping means to have increased movements.

7. In a typewriting machine having a series of means selectively operable to cause different characters to be typed, the combination with a carriage that is impositively urged in a letter-feeding direction, of two stepping means for the carriage adapted to be operatively entrained therewith for movement thereby from initial space measuring positions, a series of stop elements associated with each stepping means to limit variably their carriage-urged movements, means to control selectively the said stop elements by the selective operations of said operable means in respect to that stepping means which next is to be moved by the impositively urged carriage, and means to entrain the two stepping means alternately with the carriage at the selective operations of said operable means.

8. In a typewriter having a carriage impositively urged in character-feed direction and having a typing mechanism selectively operable to type different characters, the combination with a toothed member having connection with said carriage for movement thereby, of two stepping means adapted for alternate engagement with said toothed member to measure out step-movements to the latter, either one of said stepping means being normally engaged with said toothed member and the other one being normally disengaged therefrom, means controlled by said typing mechanism at each typing operation thereof to alternate the two stepping means as to their engagement and disengagement with said toothed member, and means conditionable differentially by said typing mechanism at selective character typing operations to determine for the particular stepping means which is next to measure out a step-movement, a step-movement which is generally proportional to the character that is being typed.

9. In a typewriter having a carriage impositively urged in character-feed direction and having a typing mechanism selectively operable to type different characters, the combination with a toothed member having connection with said carriage for movement thereby, of two stepping means adapted for alternate engagement with said toothed member to control the latter to execute step-movements, either one of said stepping means being normally engaged with said toothed member and the other one being normally disengaged therefrom, means to move the disengaged stepping means to an initial step-measuring position after each disengagement from said toothed member, means differentially conditionable to limit variably the carriage stepping movements of said stepping means, means controlled by said typing mechanism in typing different characters to condition said limiting means variably in respect to whichever stepping means is to act next controllingly for the carriage, and means controlled by said typing mechanism at each typing operation to alternate the two stepping means as to their engagement and disengagement with said toothed member.

10. In a machine having a frame member, a letter-spacing carriage member movable on said frame member, and a typing mechanism selectively operable to type different characters, a proportional letter-spacing mechanism for said carriage member comprising on one of said members a succession of teeth arranged at regular intervals and comprising on the other of said members two stepping devices for cooperation with said succession of teeth, each of said stepping devices comprising a plurality of stepping dogs having severally portions for engagement with said teeth which are spaced in the direction of the succession of said teeth in increments which are evenly divisible into said intervals, there being in each stepping device at least as many dogs as a single interval is divisible by an increment, means responsive to successive selective operations of said typing mechanism to render the dogs of the two stepping devices alternately engaged with the said teeth, and means also responsive to said successive selective operations of said typing mechanism to control differentially the stepping device which is next to step the carriage member, to determine for the carriage member, in direct relation to the width of the character being typed, a step-movement of appropriate size in terms of said increments.

11. In a machine having a frame member, a letter-spacing carriage member movable on said frame member, and a typing mechanism selectively operable to type different characters, a proportional letter-spacing mechanism for said carriage member comprising on one of said members a succession of teeth arranged at regular intervals and comprising on the other of said members two stepping devices for cooperation with said succession of teeth, each of said stepping devices comprising a plurality of stepping dogs having severally portions for engagement with said teeth which are spaced in the direction of the succession of said teeth in increments which are evenly divisible into said intervals, and means responsive to the said typing mechanism at successive selective operations thereof to engage alternately the dogs of the two stepping devices with the said teeth, and to control the two stepping devices variably by the selective operations of said typing mechanism to cause varied step movements of the carriage member in terms of multiples of the said increments, including such multiples which aggregate to less than the said intervals.

12. In a typewriting machine having a series of selectively operable means to cause the machine to type different characters, the combination with a carriage and a row of teeth having connection with the carriage for advance movement thereby, of two stepping means associated with said row of teeth to control the carriage for advance movement thereof, said two stepping means each comprising several dogs for vernier engagement with the row of teeth, and a movable support for said several dogs, means responsive to alternate operations of said operable means to render the dogs of the two supports alternately engaged with said row of teeth for advance movement thereby, and means controlled by the selective operations of said operable means to regulate the capacity for movement of whichever support will have its dogs next subjected to the advance movement of the row of teeth.

13. In a typewriting machine having a series of means selectively operable to cause different characters to be typed, the combination with a letter-feeding carriage, of two stepping means for the carriage adapted to be operatively entrained for movement thereby to measure out feed spaces thereto, corresponding series of operation limiting stop elements associated with the two stepping means, means to control said stop elements at the operations of said operable means, comprising for each pair of corresponding stop elements a mechanism which is responsive to certain of said operable means related thereto, and comprising also spring means individual to the stop elements to transmit to the latter controlling motion from the related responsive mechanisms, whereby in respect to that stepping means which is next to be moved by the carriage the stop elements are appropriately controllable independently of the other stepping means, and means to entrain the two stepping means alternately with the carriage at the selective operations of said operable means.

14. The invention set forth in claim 13, one of the said responsive mechanisms, through the related two spring means, biasing normally the related stop elements individually to potentially effective positions, and being operable to urge the related stop elements by the same two spring means to ineffective positions.

15. In a proportional space typewriter, the combination with a letter-feeding carriage, of two stepping means for the carriage adapted to be entrained alternately with the carriage to execute carriage-feeding step movements, corresponding series of stop elements associated with the two stepping means, a control member common to each pair of corresponding stop elements, and two-way acting spring means between each control member and the stop elements to which it is common, whereby at the operations and restorations of said control members the said stop elements are impositively urged respectively to assume operated and restored positions if not held up by an operated stop element.

16. In a typewriting machine having a series of selectively operable means to cause the machine to type different characters, the combination with a carriage and a row of teeth having connection with the carriage, of two stepping means alternately engageable with said row of teeth to control the advance of the carriage, and means to render the two stepping means alternately engaged with said row of teeth, comprising a toothed rotor and means to impart a movement to said rotor by each selective operation of said operable means.

17. The invention set forth in claim 16, and two levers reversely controlled by each movement imparted to the rotor to alternate the engagement of said two stepping means.

18. In a typewriting machine having means selectively operable to cause different characters to be typed, the combination with a carriage that is impositively urged in a letter-feeding direction, of two stepping means for the carriage adapted to be operatively entrained therewith for movement thereby from initial space measuring positions, stop elements associated with said stepping means and controllable to limit variably the carriage-urged movements thereof, means to entrain the two stepping means alternately with the carriage at successive selective operations of said operable means, and means to control selectively the said stop elements by the selective operations of said operable means in respect to the particular stepping means which at each of said selective operations is being entrained with the carriage.

19. In a typewriting machine having a means selectively operable to type different characters, the combination with a carriage and means impositively urging such carriage in a character-feeding direction, of two stepping means adapted to be operatively entrained alternately with the impositively urged carriage for movement thereby, either one of said stepping means being normally entrained with the carriage and the other one disentrained therefrom, step-limiting means for said stepping means, differentially conditionable by the selective operations of the operable means to restrict varyingly in accord with the size of the required letter-feed step the movement of whichever stepping means is entrained with the carriage, and means responsive to each selective operation of the operable means to entrain first whichever stepping means is disentrained and then to disentrain the other stepping means, whereby always at least one of the stepping means is entrained with the carriage and in control thereof.

20. In a typewriter having a carriage impositively urged in character-feeding direction and having a typing mechanism selectively operable to type different characters, the combination with toothed means having connection with the carriage for movement thereby, of two stepping means associated with said toothed means and being each movable into and out of engagement therewith, each said stepping means when engaged with said toothed means adapted to measure out a step-movement to the carriage, spring means to urge the two stepping means individually into engagement with the toothed means, means to control said two stepping means by the typing mechanism so that at successive typing operations the said spring means will engage alternately the two stepping means with the toothed means and so that the previously engaged stepping means becomes and stands disengaged, whereby each stepping means after engagement will measure out a step-movement to the carriage, said control means including means to institute in each typing operation first the engagement of whichever stepping means stands disengaged and then to institute the disengagement of the other, and means conditionable differentially by said typing mechanism at selective character typing operations to determine for the particular stepping means which is next to measure out a step-movement, a step-movement which is generally proportional to the width of the character being typed.

21. In a typewriting machine having a series of selectively operable means to cause the machine to type different characters, the combination with a carriage, of two stepping means for the carriage adapted to be operatively entrained alternately with the carriage to effect successive character-feeding advances of the latter, either one of the stepping means being normally entrained with the carriage and the other disentrained, and means to control the two stepping means by the successive selective operations of said operable means for alternate reversal as to entrainment and disentrainment, comprising a ratchet wheel having an even number of teeth, a pawl actuatable by each operation of said operable means to feed said wheel by one tooth, a rotor connected with said ratchet wheel for movement thereby and having teeth arranged thereon at intervals so that two tooth movements of the ratchet wheel are required to advance the rotor by one tooth, and means controlled by the teeth of said rotor to effect said alternate reversals as to entrainments and disentrainments, the teeth of said rotor being formed for control of said last means to effect each new entrainment of either stepping means before the disentrainment of the other.

22. In a typewriting machine having a means selectively operable to type different characters, the combination with a carriage and means impositively urging such carriage in a character-feeding direction, of two stepping means adapted to be operatively entrained alternately with the impositively urged carriage for movement thereby, either one of said stepping means being normally entrained with the carriage and the other one disentrained therefrom, step-limiting means for said stepping means, differentially conditionable by the selective operations of the operable means to restrict varyingly in accord with the size of the required character-feeding step the movement of whichever stepping means is entrained with the carriage, means responsive to each selective operation of the operable means to alternate the entrainment of the two stepping means, and carriage release means operable at will to render either of the stepping means which happens to be entrained, temporarily disentrained and thereby to facilitate movement of the carriage free of either of the stepping means.

23. In a typewriter having a carriage impositively urged in character-feeding direction and having a typing mechanism selectively operable to type different characters, a mechanism to character-feed the carriage generally proportionally to the width of the characters being typed and variant in terms of different multiples of a given feed increment, said mechanism comprising in combination, a toothed means having connection with the carriage for movement thereby, two stepping means adapted for alternate engagement with said toothed means to control the latter and thereby the carriage to execute character-feed movements, means to move the disengaged stepping means automatically to an initial space measuring position, said stepping means and said toothed means adapted for engagement of the former with the latter in relations variant in terms of said given feed increment, either one of said stepping means being normally disengaged from the toothed means, means controlled by the typing mechanism at each typing operation to alternate the two stepping means as to their engagement and disengagement with said toothed means, means controlled by the typing mechanism to limit in accord with the width of the character being typed and in terms variant in accord with said increments the movements of either stepping means from its initial space measuring position, whereby at each typing operation one stepping means by varyingly limited movement from its initial space measuring position determines a proportional character-feed movement for the carriage, and means including a manual control settable to different positions to determine for both said stepping means different initial space measuring positions variant in terms of said increments.

24. In a typewriting machine having a typing mechanism selectively operable to type different characters, the combination with a carriage and means impositively urging said carriage in a character-feeding direction, of two stepping means adapted to be operatively entrained alternately with the impositively urged carriage for movement thereby, either one of said stepping means being normally entrained with the carriage and the other disentrained therefrom, means controlled by the typing mechanism at each selective operation thereof to alternate the two stepping means as to their entrainment and disentrainment with the carriage, differentially adjustable step-limiting means for said stepping means, means to adjust said step-limiting means by each selective operation of the typing mechanism in respect to whichever stepping means in such typing operation becomes entrained with the carriage, and variably in accord with the size of the feed step required for the particular width of the character that is being typed, and means to maintain automatically each such effected adjustment pending an entrainment of a stepping means by a next operation of said typing mechanism.

25. In a typewriting machine having a typing mechanism selectively operable to type different characters, the combination with a carriage and means impositively urging said carriage in a character-feeding direction, of two stepping means adapted to be operatively entrained alternately with the impositively urged carriage for movement thereby, either one of said stepping means being normally entrained with the carriage and the other disentrained therefrom, means controlled by the typing mechanism at each selective operation thereof to alternate the two stepping means as to their entrainment and disentrainment with the carriage, adjustable means for each of said stepping means to limit each differentially for step movements of the carriage proportional to the character that is being typed, means to adjust at any selective operation of the typing mechanism, in accord with the size of the feed-step required for the character that is being typed, that adjustable means which is associated with the stepping means which in such typing operation becomes entrained with the carriage, and means associated with each adjustable means to maintain automatically each effected step-limiting adjustment pending an entrainment of a stepping means by a next operation of said typing mechanism.

26. In a typewriting machine having a typing mechanism selectively operable to type different characters, the combination with a carriage and means impositively urging said carriage in a character-feeding direction, of two stepping means adapted to be operatively entrained alternately with the impositively urged carriage for movement thereby, either one of said stepping means being normally entrained with the carriage and the other disentrained therefrom, means controlled by the typing mechanism at each selective operation thereof to alternate the two stepping means as to their entrainment and disentrainment with the carriage, a plurality of stop elements associated with each said stepping means and individually selectable to govern variably the step movements therefor, means to select at any selective operation of the typing mechanism, in accord with the size of the feed step required for the character that is being typed, an appropriate stop element for the stepping means which in such typing operation becomes entrained with the carriage, and detent means automatically effective to hold each selected stop element for the duration commencing with its selection and ending with a selection of a new stop element at a subsequent typing operation.

References Cited in the file of this patent

UNITED STATES PATENTS

| | | |
|---|---|---|
| 865,214 | Schuler | Sept. 3, 1907 |
| 2,385,035 | Smathers | Sept. 18, 1945 |
| 2,547,449 | Dodge | Apr. 3, 1951 |

FOREIGN PATENTS

| | | |
|---|---|---|
| 69,646 | Switzerland | July 16, 1915 |